(12) United States Patent
Morita et al.

(10) Patent No.: US 7,760,291 B2
(45) Date of Patent: Jul. 20, 2010

(54) PLANAR LIGHT-SOURCE APPARATUS

(75) Inventors: Masayoshi Morita, Tokyo (JP); Tadashi Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 11/807,565

(22) Filed: May 29, 2007

(65) Prior Publication Data

US 2008/0030648 A1 Feb. 7, 2008

(30) Foreign Application Priority Data

Jun. 2, 2006 (JP) ............................ 2006-154982

(51) Int. Cl.
*G02F 1/1335* (2006.01)
*G09F 13/04* (2006.01)
*G09F 13/08* (2006.01)

(52) U.S. Cl. .................... 349/69; 362/97.2; 362/97.3

(58) Field of Classification Search ................... 349/69; 362/97.2, 97.3
See application file for complete search history.

(56) References Cited

U.S. PATENT DOCUMENTS

2006/0221612 A1* 10/2006 Song et al. .................. 362/247
2009/0046221 A1* 2/2009 Miyachi ....................... 349/69

OTHER PUBLICATIONS

Kakinuma, K. et al., Nikkei Electronics, Dec. 20, 2004, pp. 123-130.

* cited by examiner

*Primary Examiner*—Uyen-Chau N Le
*Assistant Examiner*—Kajli Prince
(74) *Attorney, Agent, or Firm*—Wolf, Greenfield & Sacks, P.C.

(57) ABSTRACT

A planar light-source apparatus illuminates, from the backside, a transmissive liquid crystal display having a display area composed of pixels formed in a two-dimensional matrix arrangement, and the planar light-source apparatus includes a diffusing plate facing the liquid crystal display, a plurality of planar light-source units, each unit having a light source, and a support wall arranged between the planar light-source units for supporting the diffusing plate, and the top face of the support wall lies adjacent to the diffusing plate.

15 Claims, 8 Drawing Sheets

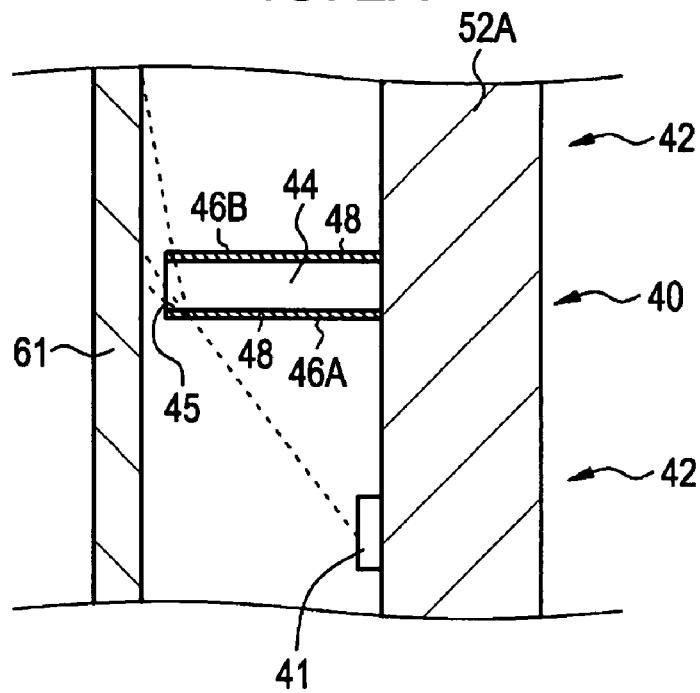
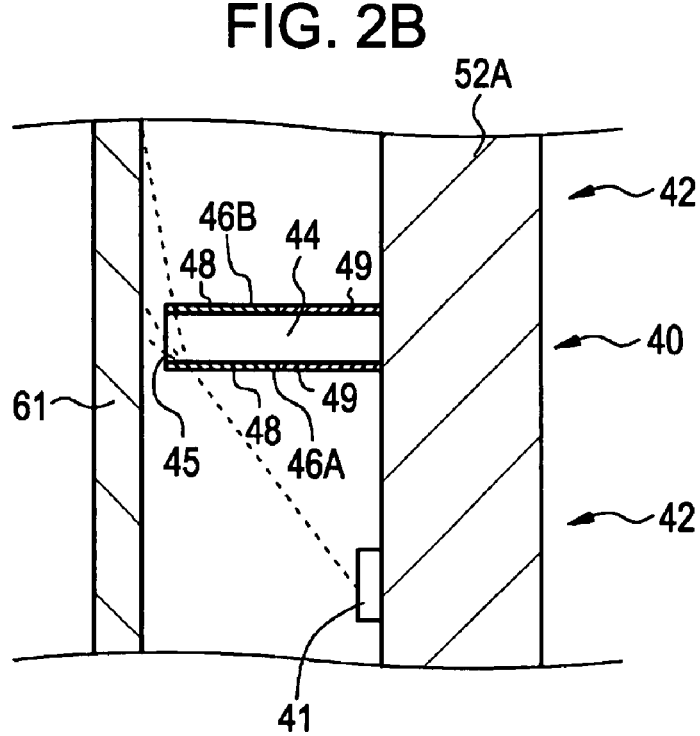

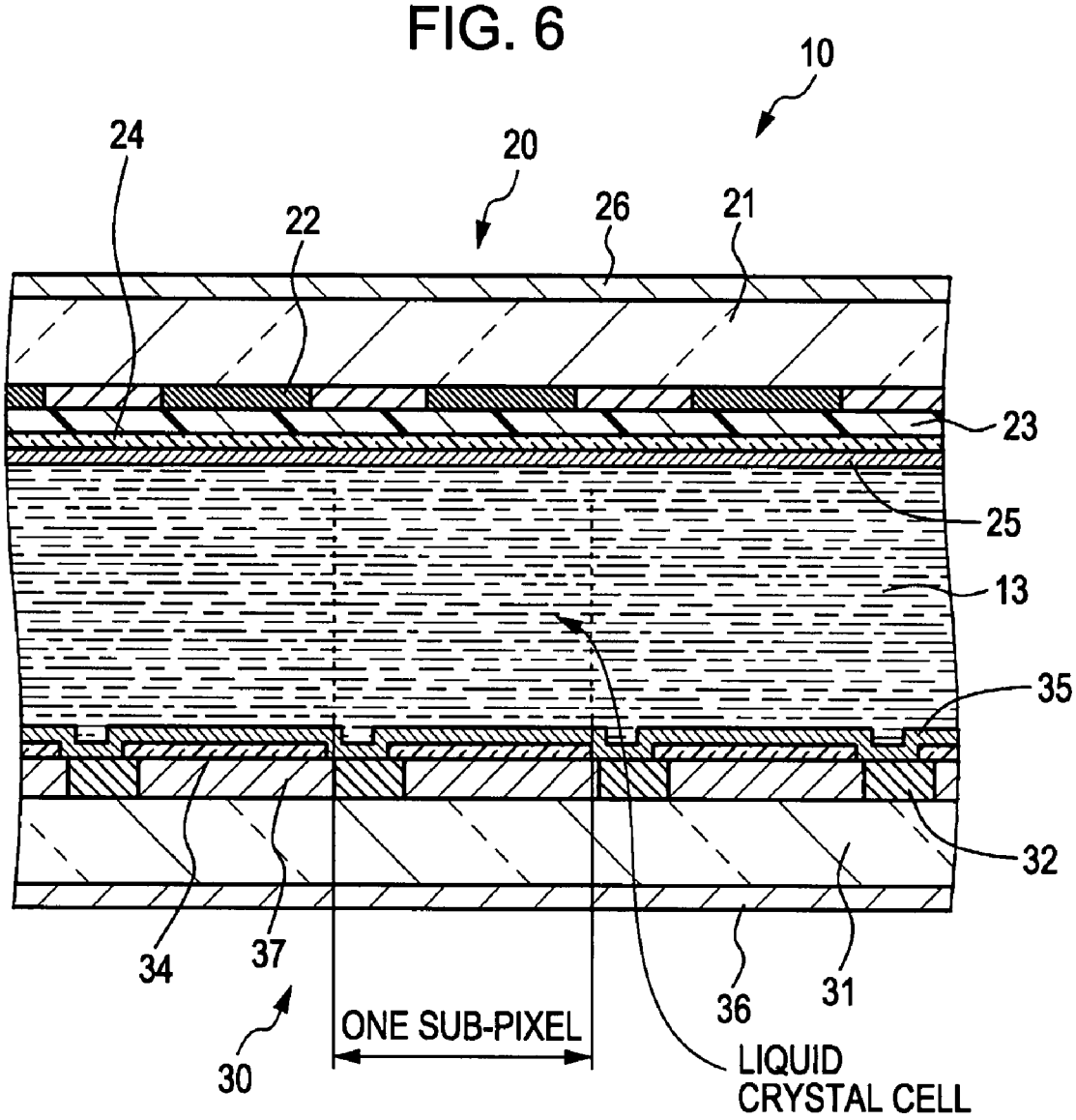

PLANAR LIGHT-SOURCE APPARATUS

CROSS REFERENCES TO RELATED APPLICATIONS

The present invention contains subject matter related to Japanese Patent Application JP 2006-154982 filed in the Japanese Patent Office on Jun. 2, 2006, the entire contents of which are incorporated herein by reference.

BACKGROUND OF THE INVENTION

1. Field of the Invention

The present invention relates to a planar light-source apparatus.

2. Description of the Related Art

In a liquid crystal display, a liquid crystal material itself does not emit light. Hence, a direct-lighting type planar light-source apparatus (backlight) is arranged on the back of a display area, composed of a plurality of pixels, of a liquid crystal display for illuminating the display area (see Nikkei Electronics No. 889, Dec. 20, 2004, p123 to 130). In a color liquid crystal display, one pixel is composed of a red-luminous sub-pixel, a green-luminous sub-pixel, and a blue-luminous sub-pixel. A liquid crystal cell constituting a pixel or a sub-pixel is operated as a kind of optical shutter (light valve) so as to control the light transmittance (open area ratio) of the pixel or the sub-pixel. Thereby, images are displayed by controlling the light transmittance of illuminating light (white light, for example) emitted from the planar light-source apparatus.

The planar light-source apparatus (backlight) includes a casing, a plurality of light sources arranged within the casing, and a diffusing plate arranged in an upper portion of the casing. The light source may include a light emitting diode (LED) and a cold cathode-ray fluorescent lamp. The diffusing plate is generally made of plastics, and has a thickness of about 2 mm, depending on the size of the liquid crystal display. Its rigidity is not enough for maintaining the flatness by itself when it is held horizontal. Hence, for supporting the plastic diffusing plate, a columnar or conical brace is arranged within the casing. The end extremity of the brace is not in contact with the diffusing plate normally; however, during manufacturing and transporting the planar light-source apparatus or during assembling the planar light-source apparatus with the liquid crystal display and transporting the assembly of both the apparatuses, the end extremity of the brace may come in contact with the diffusing plate, so that the damage of the diffusing plate can be prevented due to its deflection.

SUMMARY OF THE INVENTION

However, in a supporting structure of the diffusing plate with such a brace, during manufacturing and transporting the planar light-source apparatus or during assembling the planar light-source apparatus with the liquid crystal display and transporting their assembly, when an excessive force is applied to the brace, the brace may be damaged. Since the diffusing plate and the brace are made of plastics, dust (dirt and powder) may also be generated due to the contact between both the members. Furthermore, another problem may arise that uneven brightness of the diffusing plate is generated due to the shadow of the brace.

Accordingly, it is desirable to provide a planar light-source apparatus having a structure in that a member for supporting a diffusing plate is difficult to be damaged as well as difficult to generate dust (dirt and powder).

According to an embodiment of the present invention, there is provided a planar light-source apparatus for illuminating, from the backside, a transmissive liquid crystal display having a display area composed of pixels formed in a two-dimensional matrix arrangement, the planar light-source apparatus includes a diffusing plate facing the liquid crystal display, a plurality of planar light-source units, each unit having a light source, and a support wall arranged between the planar light-source units for supporting the diffusing plate, wherein the top face of the support wall lies adjacent to the diffusing plate.

Preferably, when the display area of the liquid crystal display is assumed to be divided into (P×Q) virtual display area units, the plurality of planar light-source units include (P×Q) planar light-source units corresponding to the (P×Q) display area units, and the light source provided in the light-source unit is individually controlled. Such a configuration may be conveniently called as a sectional drive planar light-source apparatus.

In the planar light-source apparatus according to the embodiment of the present invention including the above-mentioned preferred configuration, light emitted from the light source provided in the light-source unit may be diffused on a first side facing the light source of the support wall, and incident light in the interior of the support wall from the first side of the support wall may be emitted from a second side opposing the first side of the support wall and from the top face of the support wall. The diffusion of light herein means a random walk phenomenon in that when light proceeds within a body where an optical depth is large and an average free process is extremely small, the light is changed in direction by collision with the body or by interaction. This phenomenon may be measured in conformity with JIS K7105: 1981 "the test method of optical characteristics of plastics" (Japanese Industrial Standard).

In this case, the support wall may be made of a material transparent to the light emitted from the light source provided in the light-source unit, and unevenness may be formed on at least upper parts of the first side and the second side of the support wall or the unevenness may also be formed on the whole parts of the first side and the second side of the support wall. Alternatively, the unevenness may be formed on the upper parts of the first side and the second side of the support wall, while a light reflection layer may be formed on the residual parts of the first side and the second side of the support wall. The forming method of the unevenness includes a sandblast method, for example. The upper parts of the first side and the second side of the support wall to be formed with the unevenness are not specifically limited; however, the upper part means part of the support wall positioned above the horizontal plane including the light source and intersecting with the support wall.

Alternatively, in this case, the support wall may be made of a material transparent to the light emitted from the light source provided in the light-source unit, and a light-transmissive diffusing film may be bonded on at least upper parts of the first side and the second side of the support wall or the light-transmissive diffusing film may also be bonded on the whole parts of the first side and the second side of the support wall. Alternatively, the light-transmissive diffusing film may be bonded on the upper parts of the first side and the second side of the support wall, while the light reflection layer may be formed on the residual parts of the first side and the second side of the support wall. The bonding of the light-transmissive diffusing film may use an adhesive or an adhesive sheet. The upper parts of the first side and the second side of the support wall to be bonded with the light-transmissive diffusing film are not specifically limited; however, the upper part means part of the support wall positioned above the horizontal plane including the light source and intersecting with the support wall.

The support wall material being transparent to the light emitted from the light source provided in the light-source unit may include polymethylmethacrylate (PMMA), a polycarbonate resin (PC), a polyarylate resin (PAR), a polyethylene terephthalate resin (PET), and glass, for example. The light reflection layer may be formed by bonding a silver-added reflection film or a light reflection film, or by plating a metallic layer or a metallic alloy layer. The diffusing plate material may include polymethylmethacrylate (PMMA) and a polycarbonate resin (PC), for example.

The top face of the support wall lies adjacent to the diffusing plate. Specifically, since the liquid crystal display is positioned substantially vertically when it is used, the top face of the support wall is not in contact with the diffusing plate in this state, and the clearance between the top face and the diffusing plate is 1.5 mm or less, preferably 1.0 mm or less. On the other hand, when the planar light-source apparatus is horizontally held during manufacturing the planar light-source apparatus or during assembling the planar light-source apparatus with the liquid crystal display, the diffusing plate may come in contact with the top face flatly because of the deflection of the diffusing plate.

In the planar light-source apparatus according to the embodiment of the present invention including the above-mentioned preferred configuration, the light source of the planar light-source unit constituting the planar light-source apparatus may include a light emitting diode (LED), a cold cathode-ray fluorescent lamp, an electroluminescence (EL), a cold cathode field emission device (FED), a plasma display, or a normal lamp. When the light source is composed of the light emitting diodes, they are grouped into sets, each set being composed of a red-light (wavelength 640 nm) emitting diode, a green-light (wavelength 530 nm) emitting diode, and a blue-light (wavelength 450 nm) emitting diode so as to obtain white light. Alternatively, the white light may be obtained by a white-light emitting diode (the combination of an ultraviolet- or a blue-light emitting diode with fluorescent particles, for example). In addition to red, green, and blue, the fourth color and the fifth color may further be provided.

When the light source is composed of the light emitting diodes, a plurality of red-light emitting diodes, a plurality of green-light emitting diodes, and a plurality of blue-light emitting diodes are arranged within a casing. More specifically, the light source may be composed of light-emitting diode units, each unit being composed of combinations of (one red-light emitting diode, one green-light emitting diode, and one blue-light emitting diode), (one red-light emitting diode, two green-light emitting diodes, and one blue-light emitting diode), and (two red-light emitting diodes, two green-light emitting diodes, and one blue-light emitting diode). One planar light source unit is provided with at least one light-emitting diode unit.

The light emitting diode may have a so-called face-up structure or a flip chip structure. Namely, the light emitting diode includes a substrate and a luminous layer formed on the substrate so that light may emit outside from the luminous layer or light from the luminous layer may pass through the substrate to emit outside. More specifically, the light emitting diode (LED) includes a layered structure of a first clad layer composed of a first conductivity-type (n-type, for example) compound semiconductor layer formed on the substrate, an active layer formed on the first clad layer, and a second clad layer composed of a second conductivity-type (p-type, for example) compound semiconductor layer formed on the active layer, as well as a first electrode electrically connected to the first clad layer and a second electrode electrically connected to the second clad layer. The layers of the light emitting diode may be made of a known compound semiconductor material depending on a luminous wave length.

In the planar light source apparatus according to the embodiment of the present invention, an optical sensor is preferably provided for measuring a luminous state of the light source (specifically, the luminance, the chromaticity, or the luminance/chromaticity of the light source). The number of the optical sensors may be at least one; however, it is preferable that each planar light-source unit be provided with one set of the optical sensor in view of the secured measurement of the luminous state of each planar light-source unit. The optical sensor may include a known photodiode and CCD (charge coupled device). When the light source is grouped into sets, each set being composed of the red-light emitting diode, the green-light emitting diode, and the blue-light emitting diode, the luminous state of the light source to be measured by the optical sensor is the luminance and chromaticity of the light source. In this case, one set of the optical sensor may include a photodiode having a red filter for measuring red-light intensity, a photodiode having a green filter for measuring green-light intensity, and a photodiode having a blue filter for measuring blue-light intensity.

Upon driving the planar light-source apparatus according to the embodiment of the present invention, the light sources provided in each planar light-source unit may be driven under substantially the same condition, or by the sectional drive system as mentioned above. In the former case, the light sources provided in each planar light-source unit are normally driven so as to obtain the first reference value $Y_1$ of the light-source luminance which will be described later.

In the sectional drive system, the light transmittance (open area ratio) Lt of the pixel or the sub-pixel, the luminance (display luminance) y of part of the display area corresponding to the pixel or the sub-pixel, and the luminance (light-source luminance) Y of the planar light-source unit are defined as follows.

$Y_1$ ... the maximum luminance of the light-source luminance and may be referred to as the first reference value $Y_1$ of the light-source luminance below.

$Lt_1$ ... the maximum value of the light transmittance (open area ratio) of the pixel or the sub-pixel, and may be referred to as the first reference value of the light transmittance below.

$Lt_2$ ... the light transmittance (open area ratio) of the pixel or the sub-pixel obtained when it is assumed that when the light-source luminance is the first reference value $Y_1$ of the light-source luminance, the control signal value be supplied to the pixel or the sub-pixel, the control signal value being equivalent to the drive signal maximum value $x_{U\text{-}max}$ in the display area unit in drive signal values inputted in the drive circuit for driving all the pixels constituting the display area unit, and may be referred to as the second reference value of the light transmittance below, where $0 \leq Lt_2 \leq Lt_1$.

$Y_2$ ... the display luminance obtained when it is assumed that the light-source luminance be the first reference value $Y_1$ of the light transmittance and the light transmittance (open area ratio) of the pixel or the sub-pixel is the second reference value $Lt_2$ of the light transmittance and may be referred to as the second reference value of the display luminance below.

$Y_2$ ... the light-source luminance of the planar light-source unit for setting the luminance of the pixel or the sub-pixel at the second reference value $y_2$ of the display luminance obtained when it is assumed that the control signal value be supplied to the pixel or the sub-pixel, the control signal value being equivalent to the drive signal maximum value $x_{U\text{-}max}$ in the display area unit in drive signal values inputted in the drive circuit for driving all the pixels constituting the display area unit, as well as when it is assumed that the light transmittance (open area ratio) of the pixel or the sub-pixel at this time be corrected to the first reference value $Lt_1$ of the light transmittance. However, the light-source luminance $Y_2$ may be corrected in consideration of the effect on the light-source luminance of the other planar light-source units from the light-source luminance of each planar light-source unit.

During sectional driving the planar light-source apparatus according to the embodiment of the present invention, in order to obtain the pixel luminance (the second reference value $y_2$ of the display luminance in the first reference value $Lt_1$ of the light transmittance) when it is assumed that the control signal value be supplied to the pixel, the control signal value being equivalent to the drive signal maximum value $x_{U\text{-}max}$ in the display area unit, the luminance of the light-source constituting the planar light-source unit corresponding to the display area unit is controlled in the drive circuit. Specifically, when setting the light transmittance (open area ratio) of the pixel or the sub-pixel at the first reference value $Lt_1$ of the light transmittance, the light-source luminance $Y_2$ may be controlled (at least reduced) for obtaining the display luminance $y_2$. That is, the light-source luminance $Y_2$ may be controlled every frame in the picture display of the liquid crystal display (referred to as the image display frame) for satisfying the following equation (1), where $Y_2 \leqq Y_1$.

$$Y_2 \cdot Lt_1 = Y_1 \cdot Lt_2 \tag{1}$$

The drive circuit includes a planar light-source apparatus control circuit (a backlight control unit and a planar light-source unit drive circuit), including a pulse-width modulation (PWM) signal generating circuit, a duty ratio control circuit, a light emitting diode (LED) drive circuit, an arithmetic circuit, and a memory, and a liquid crystal display drive circuit including a known timing controller.

When the light emitted from the light emitting diode is directly projected to the liquid crystal display positioned upwardly, that is, the light is projected only along the Z-axis from the light emitting diode, the luminance nonuniformity may be generated in the planar light-source apparatus. The means for avoiding such a phenomenon includes a two-dimensional direction emitting configuration in that an assembly of the light emitting diode having a light ejection lens attached thereto is used as the light source and part of the light emitted from the light emitting diode is totally reflected at the top face of the light ejection lens so as to be mainly emitted in the horizontal direction of the light ejection lens (see Nikkei Electronics No. 889, Dec. 20, 2004, p123 to 130 mentioned above).

Furthermore, the planar light-source apparatus may include an optical functional sheet group, such as a diffusing sheet, a prism sheet, a polarization conversion sheet, and a reflection sheet.

The transmissive liquid crystal display includes a front panel having a transparent first electrode, a rear panel having a transparent second electrode, and a liquid crystal material provided between the front panel and the rear panel.

More specifically, the front panel includes a first substrate, such as a glass substrate and a silicon substrate, the transparent first electrode (referred to also as a common electrode and made of ITO) provided on the internal surface of the first substrate, and a polarization film formed on the external surface of the first substrate. Furthermore, the transmissive color liquid crystal display includes color filters provided on the internal surface of the first substrate and covered with an over coat layer made of an acrylic resin or an epoxy resin. The arrangement pattern of the color filters includes a delta arrangement, a stripe arrangement, a diagonal arrangement, and a rectangle arrangement. The front panel is provided with the transparent first electrode further formed on the over coat layer, and on the transparent first electrode, an alignment layer is formed. On the other hand, more specifically, the rear panel includes a second substrate, such as a glass substrate and a silicon substrate, a switching element formed on the internal surface of the second substrate, the transparent second electrode (referred to also as a pixel electrode and made of ITO) controlled in conduction/non-conduction by the switching element, and a polarization film formed on the external surface of the second substrate. On whole surfaces including that of the transparent second electrode, the alignment layer is formed. Various members and liquid crystal materials constituting the liquid crystal display including the transmissive color liquid crystal display are known. The switching element includes a three-terminal element, such as an MOS (metal oxide semiconductor)-type FET (field-effect transistor) formed on a monocrystal silicon semiconductor substrate, and a two-terminal element, such as an MIM (metal injection molding) element, a varistor element, and a diode.

The region of the transparent first electrode overlapping with those of the transparent second electrode and the liquid crystal cell corresponds to one pixel or one sub-pixel. In the transmissive color liquid crystal display, a red-luminous sub-pixel (sub-pixel [R]) is composed of combinations of such a region and a red-transmissive color filter; a green-luminous sub-pixel (sub-pixel [G]) is composed of combinations of such a region and a green-transmissive color filter; and a blue-luminous sub-pixel (sub-pixel [B]) is composed of combinations of such a region and a blue-transmissive color filter. The arrangement pattern of the sub-pixel [R], the sub-pixel [G], and the sub-pixel [B] agrees with that of the color filters mentioned above. The pixel is not limited to the configuration forming a group of every three sub-pixels [R], [G], and [B], so that the pixel may be configured by forming a group of one or a plurality of sub-pixels added to the three sub-pixels. For example, there may be one group added by a white luminous sub-pixel for improving the luminance, one group added by a complementary color luminous sub-pixel for extending the color reproduction range, one group added by a yellow luminous sub-pixel for extending the color reproduction range, and one group added by yellow and cyan luminous sub-pixels for extending the color reproduction range.

When the number of pixels ($M_0 \times N_0$) formed in a two-dimensional matrix arrangement is expressed by ($M_0$, $N_0$), the values of ($M_0$, $N_0$) may include various image display resolution specific examples, such as VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), and further (1920, 1035), (720, 480), and (1280, 960). The values are not limited to these examples, and are not limited as the relationship between the value ($M_0$, $N_0$) and the value (P, Q). Examples are shown in the following Table 1. The number of pixels constituting one display area unit may be from (20×20) to (320×240), preferably, from (50×50) to (200×200). The number of the pixels in the display area unit may be constant or different.

TABLE 1

| | P VALUE | Q VALUE |
|---|---|---|
| VGA (640, 480) | 2~32 | 2~24 |
| S-VGA (800, 600) | 3~40 | 2~30 |
| XGA (1024, 768) | 4~50 | 3~39 |
| APRC (1152, 900) | 4~58 | 3~45 |
| S-XGA (1280, 1024) | 4~64 | 4~51 |
| U-XGA (1600, 1200) | 6~80 | 4~60 |
| HD-TV (1920, 1080) | 6~86 | 4~54 |
| Q-XGA (2048, 1536) | 7~102 | 5~77 |
| (1920, 1035) | 7~64 | 4~52 |
| (720, 480) | 3~34 | 2~24 |
| (1280, 960) | 4~64 | 3~48 |

In the planar light-source apparatus according to the embodiment of the present invention, the top face of the support wall lies adjacent to the diffusing plate. That is, since the liquid crystal display is positioned substantially vertically when it is used, the top face of the support wall is not in contact with the diffusing plate in this state. On the other hand, when the planar light-source apparatus is horizontally held during manufacturing the planar light-source apparatus or during assembling the planar light-source apparatus with the liquid crystal display, the diffusing plate may come in contact with the top face flatly because of the deflection of the diffusing plate. Since the top face of the diffusing plate comes in contact with the support wall flatly in this case, the support wall is difficult to be damaged. Also, since the top face of the support wall is not normally in contact with the diffusing plate, dust (dirt or powder) generated due to the contact between the diffusing plate and the support wall can be suppressed. Furthermore, the light emitted from the light-emitting source provided in the planar light-source unit is diffused by a first side of the support wall, which faces the light-emitting source, so as to enter the interior of the support wall from the first side of the support wall. Then, when the light is emitted from the top face of the support wall, the shadow of the support wall is difficult to be formed so as to avoid the possibility of the luminance non-uniformity of the diffusing plate. Such a state can be achieved by making the support wall of a material transparent to the light emitted from the light-emitting source provided in the planar light-source unit, as well as by forming unevenness on at least upper parts of the first side and the second side of the support wall, or by bonding a light-transmissive diffusing film on at least upper parts of the first side and the second side of the support wall.

Furthermore, in the planar light-source apparatus according to the embodiment of the present invention, in order to obtain the pixel luminance (the second reference value $y_2$ of the display luminance in the first reference value $Lt_1$ of the light transmittance) when it is assumed that the control signal value be supplied to the pixel, the control signal value being equivalent to the drive signal maximum value $x_{U-max}$ in the display area unit, the luminance of the light-source constituting the planar light-source unit corresponding to the display area unit is controlled in the drive circuit, so that not only the power consumption of the planar light-source apparatus can be reduced, but also the white level is increased and the black level is reduced so as to obtain the high contrast ratio (the luminance ratio between the whole black display portion and the whole white display portion, which does not include outside light reflection, in the picture surface of the liquid crystal display). Thereby, the emphasis of the desired brightness of the display area is enabled, improving quality of displayed images.

BRIEF DESCRIPTION OF THE DRAWINGS

FIGS. 2A and 2B are conceptual diagrams of part of a planar light-source apparatus including a supporting wall according to third and fourth embodiments, respectively;

FIG. 6 is a schematic partial sectional view of the color liquid crystal display;

DESCRIPTION OF THE PREFERRED EMBODIMENTS

A planar light-source apparatus according to embodiments of the present invention will be described below with reference to the drawings. Preparatory to the description, the summary of a transmissive crystal display and a planar light-source apparatus suitably incorporating the embodiments will be described with reference to FIGS. 3 to 6. According to the embodiments, a sectional drive system is adopted for driving the planar light-source apparatus.

Figure 3:
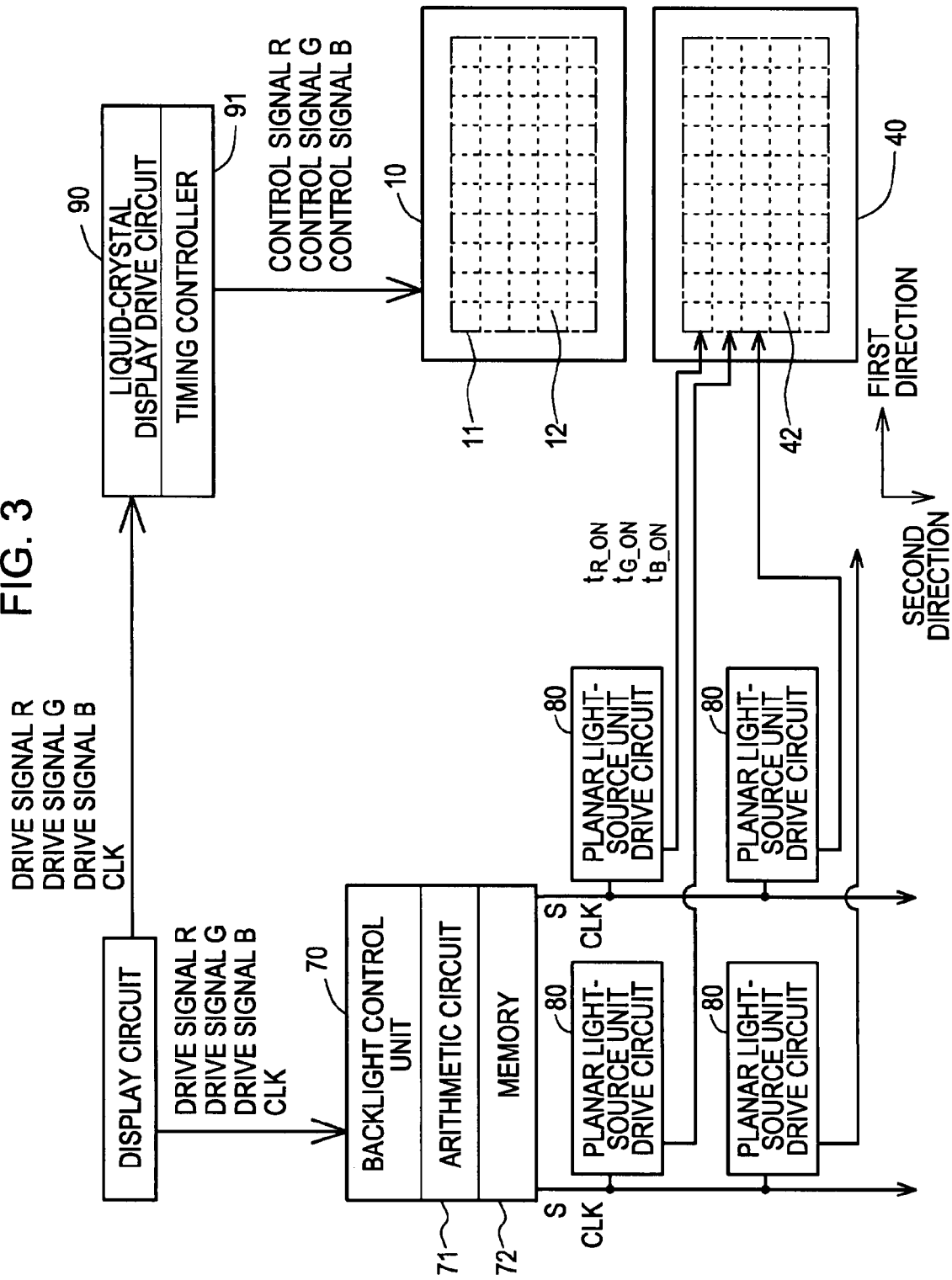
FIG. 3 is a conceptual diagram of a liquid crystal display assembly composed of a color liquid crystal display and the planar light-source apparatus suitably incorporating the embodiments.

As shown in the conceptual diagram of FIG. 3, a transmissive color liquid crystal display 10 includes a display area 11, in which $M_0$ pixels aligned along a first direction and $N_0$ pixels aligned along a second direction are formed in a two-dimensional matrix arrangement with ($M_0 \times N_0$) pixels in total. The display area 11 herein is assumed to be divided into ($P \times Q$) virtual display area units 12. The display area unit 12 is composed of a plurality of pixels. Specifically, the image display resolution complies with the HD-TV Standard, so that it designates (1920, 1080), for example, when the number of ($M_0 \times N_0$) pixels formed in a two-dimensional matrix arrangement is designated by ($M_0 \times N_0$). Also, the display area 11 (shown by the chain line of FIG. 3) is divided into P×Q virtual display area units 12 (the boundary is shown by the dotted line). The value (P, Q) designates (19, 12), for example. However, for simplicity of the drawings, the number of the display area units 12 (and below-mentioned planar light-source units 42) in FIG. 3 is different from this value. The display area unit 12 is composed of a plurality of (P×Q) pixels, and the number of pixels constituting one display area unit 12 is about 10,000, for example. Each pixel has a set of a plurality of sub-pixels emitting different colors, respectively. More specifically, each pixel is composed of the three sub-pixels of a red-luminous sub-pixel (sub-pixel R), a green-luminous sub-pixel (sub-pixel G), and a blue-luminous sub-pixel (sub-pixel B). The transmissive color liquid crystal display 10 is sequentially and linearly driven. More specifically, the color liquid crystal display 10 includes data electrodes (extending along the second direction) and scanning electrodes (extending along the first direction) intersecting with the data electrodes in a matrix arrangement. A scanning signal is inputted in the scanning electrode to select and scan the scanning electrode, and images are displayed based on a data signal (a signal based on a control signal) inputted in the data electrode so as to form one picture.

The color liquid crystal display 10, as shown in the schematic partial sectional view of FIG. 6, includes a front panel 20 having a transparent first electrode 24, a rear panel 30 having a transparent second electrode 34, and a liquid crystal material 13 provided between the front panel 20 and the rear panel 30.

The front panel 20 includes a first glass substrate 21 and a polarizing film 26 formed on the outer surface of the first substrate 21. On the internal surface of the first substrate 21, a color filter 22 covered with an overcoat layer 23 made of an acrylic resin or an epoxy resin is provided. On the overcoat layer 23, the transparent first electrode 24 (referred also to as the common electrode and made of an ITO, for example) is formed. On the transparent first electrode 24, an alignment layer 25 is formed. On the other hand, more specifically, the rear panel 30 includes a second glass substrate 31, switching elements 32 (specifically, thin film transistors (TFTs) formed on the internal surface of the second substrate 31, a transparent second electrode 34 (referred also to as a pixel electrode and made of an ITO, for example), of which the turning on/off is controlled by the switching element 32, and a polarizing film 36 provided on the external surface of the second substrate 31. On the whole surface including the transparent second electrode 34, an orientation film 35 is formed. The front panel 20 and the rear panel 30 are bonded together at their outer peripheries via a sealant (not shown). The switching element 32 is not limited to the TFT, so that it may also be an MIM (metal injection molding) element. Reference numeral 37 in the drawing denotes an insulating layer provided between the switching elements 32.

Various members and liquid crystal materials constituting the transmissive color crystal display are known, so that the detail description is omitted.

Figure 5A:
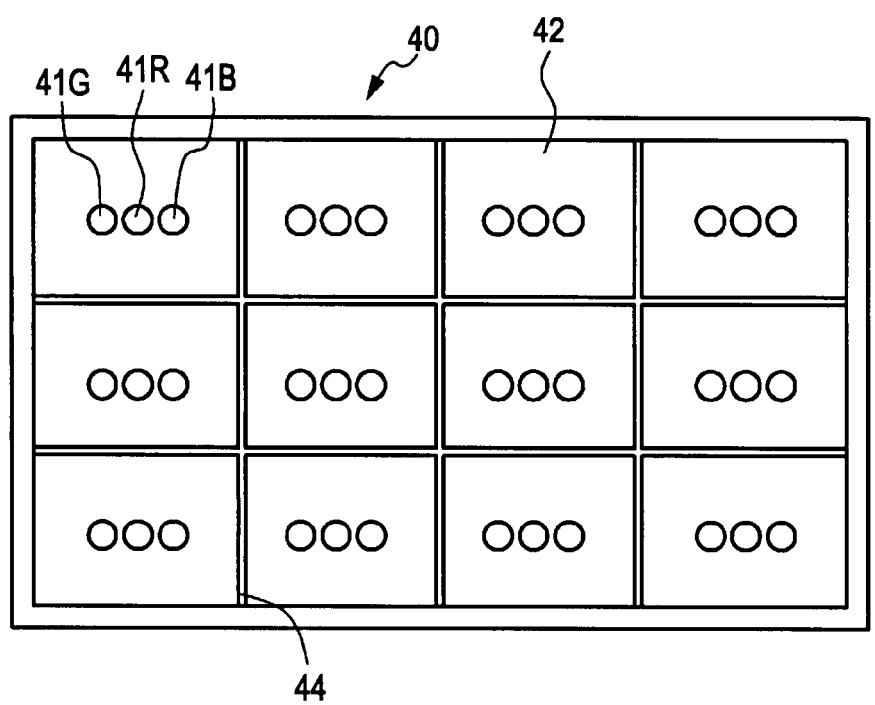
FIG. 5A is a drawing schematically showing the arrangement of light emitting diodes in the planar light-source apparatus according to the embodiments and FIG. 5B is a schematic partial sectional view of the liquid crystal display assembly composed of the color liquid crystal display and the planar light-source apparatus according to the embodiments.

A direct-lighting type planar light-source apparatus (backlight) 40 is composed of (P×Q) planar light-source units 42 corresponding to the (P×Q) virtual display area units 12. Each planar light-source unit 42 illuminates, from the backside, the display area unit 12 corresponding to the planar light-source unit 42. The light sources of the planar light-source units 42 are individually controlled. The planar light-source apparatus 40 is positioned below the transmissive color liquid crystal display 10 in practice; however, in FIG. 3, the transmissive color liquid crystal display 10 is separated from the planar light-source apparatus 40. The arrangement of light-emitting diodes in the planar light-source apparatus 40 is schematically shown in FIG. 5A, and a liquid crystal display assembly of the transmissive color liquid crystal display 10 and the planar light-source apparatus 40 is schematically shown in the partial sectional view of FIG. 5B. The light source is composed light-emitting diodes 41 driven in a pulse-width modulation control system.

Figure 5B:
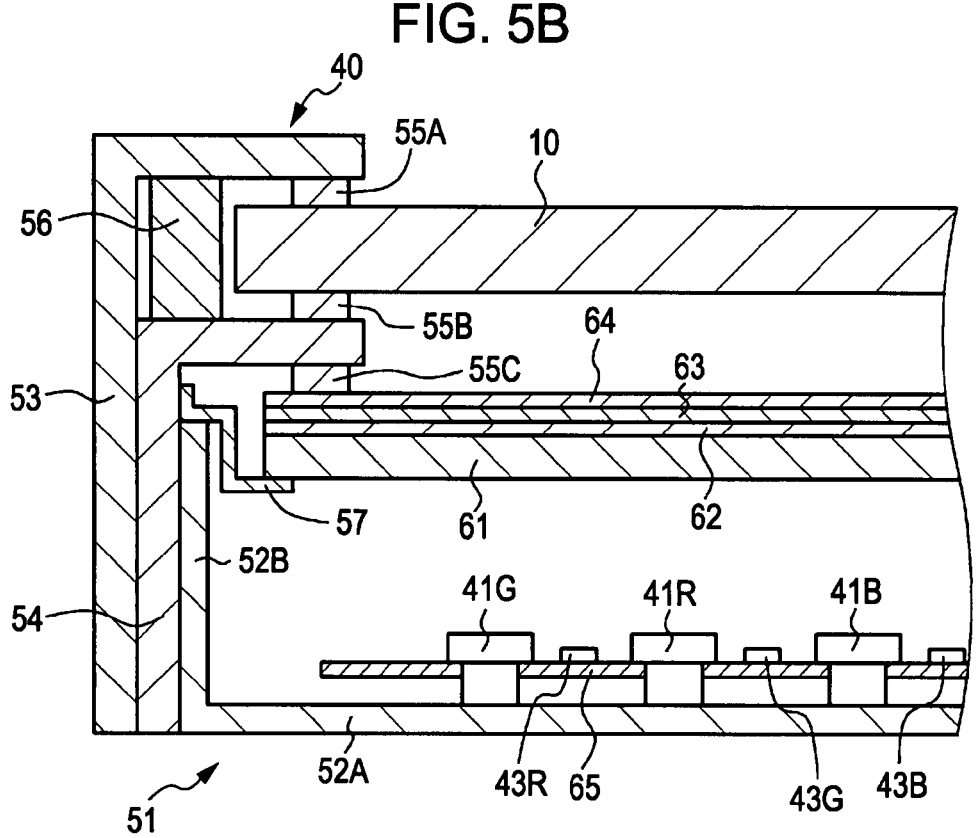

The planar light-source apparatus 40, as shown in FIG. 5B, includes a casing 51 composed of an outer frame 53 and an inner frame 54. Ends of the transmissive color liquid crystal display 10 are sandwiched and held between the outer frame 53 and the inner frame 54 via spacers 55A and 55B. Between the outer frame 53 and the inner frame 54, guide members 56 are also arranged so as to prevent the transmissive color liquid crystal display 10 sandwiched between the outer frame 53 and the inner frame 54 from being displaced. In an upper portion within the casing 51, a diffusing plate 61 is attached to the inner frame 54 via bracket members 57. On the diffusing plate 61, an optical functional sheet group of a diffusing sheet 62, a prism sheet 63, and a polarization conversion sheet 64 is laminated.

In a lower portion within the casing 51, a reflection sheet 65 is provided. The reflection sheet 65 is attached on top of the bottom surface 52A of the casing 51 via mounting members (not shown) so that its reflection surface opposes the diffusing plate 61. The reflection sheet 65 may be made of a silver-added reflection film that is formed by sequentially laminating a silver reflection film, a low refractive-index film, and a high refractive-index film on a sheet base. The reflection sheet 65 reflects light emitted from a plurality of the light-emitting diodes 41 (the light source 41) and light reflected from the sides 52B of the casing 51 as well as, on some occasion, reflected from a support wall 44 shown in FIGS. 1A to 5A. In such a manner, red light, green light, and blue light emitted from a plurality of red light-emitting diodes 41R (light source 41R), a plurality of green light-emitting diodes 41G (light source 41G), and a plurality of blue light-emitting diodes 41R (light source 41B), respectively, are mixed together so as to obtain genuine white light as illumination light. The illumination light passes through the diffusing plate 61, the diffusing sheet 62, the prism sheet 63, and the polarization conversion sheet 64 so as to illuminate the transmissive color liquid crystal display 10 from the backside.

In the vicinity of the bottom surface 52A of the casing 51, photo-diodes 43R, 43G, and 43B are arranged as optical sensors. The photo-diode 43R has a red-color filter to measure the optical power of red light; the photo-diode 43G has a green-color filter to measure the optical power of green light; and the photo-diode 43B has a blue-color filter to measure the optical power of blue light. A set of the optical sensors (the photo-diodes 43R, 43G, and 43B) herein is arranged for one planar light-source unit 42. The emitting state of the light sources 41R, 41G, and 41B measured by the photo-diode 43R, 43G, and 43B, respectively, includes the luminance and chromaticity of the photo-diodes 43R, 43G, and 43B.

The light-emitting diodes, for example, are grouped into a plurality of light-emitting diode units, each unit being a set of a red-light (wavelength 640 nm) emitting diode 41R, a green-light (wavelength 530 nm) emitting diode 41G, and a blue-light (wavelength 450 nm) emitting diode 41B. Then, the light-emitting diodes 41R, 41G, and 41B may be arranged by aligning the plurality of the light-emitting diode units in a horizontal direction and a vertical direction. In this case, one light-emitting diode unit is arranged for one planar light-source unit 42.

The planar light-source units 42 constituting the planar light-source apparatus 40 are divided with the support wall 44. One planar light-source unit 42 may be surrounded by four support walls 44, three support walls 44 and one side 52B, or two support walls 44 and two sides 52B. The support wall 44 is attached on the bottom surface 52A of the casing 51 via a mounting member (not shown).

Figure 4:
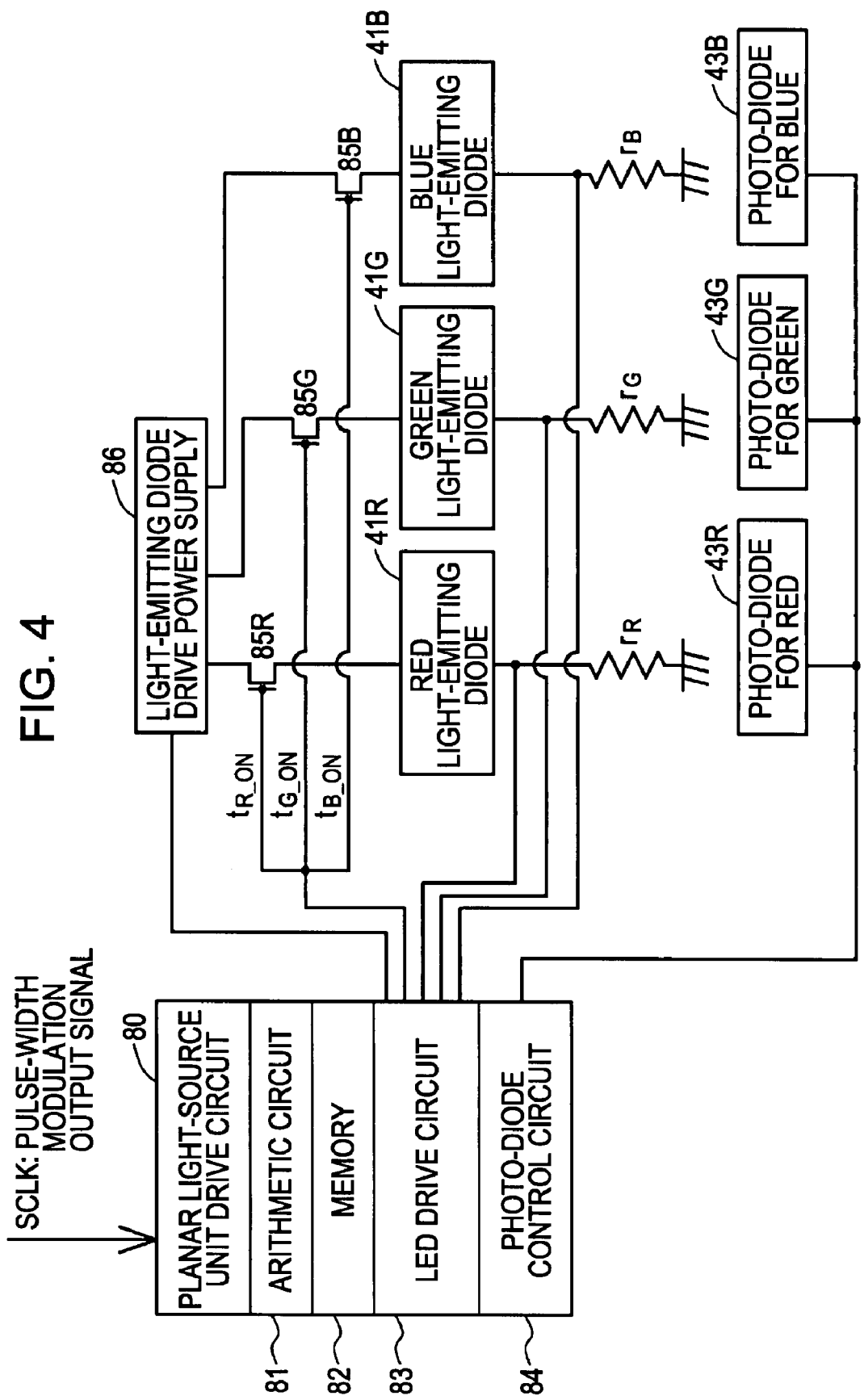
FIG. 4 a conceptual diagram of part of a drive circuit suitably incorporating the embodiments.

As shown in FIGS. 3 and 4, the drive circuit for driving the planar light-source apparatus 40 and the transmissive color liquid crystal display 10 on the basis of a drive signal from the exterior (the display circuit) includes a backlight control unit 70 for turning on/off the red-light emitting diode 41R, the green-light emitting diode 41G, and the blue-light emitting diode 41B by the pulse-width modulation control system; a planar light-source unit drive circuit 80; and a liquid-crystal display drive circuit 90. The backlight control unit 70 includes an arithmetic circuit 71 and a memory 72. On the other hand, the planar light-source unit drive circuit 80 includes an arithmetic circuit 81, a memory 82, an LED drive circuit 83, a photo-diode control circuit 84, switching elements 85R, 85G, and 85B composed of FETs (field effect transistors), and a light-emitting diode drive power supply (a constant-current source) 86. These circuits constituting the backlight control unit 70 and the planar light-source unit drive circuit 80 may be made of known circuits. On the other hand, the liquid-crystal display drive circuit 90 for driving the transmissive color liquid crystal display 10 is configured of a known circuit such as a timing controller 91. The transmissive color liquid crystal display 10 includes a gate driver and a source driver (which are not shown) for driving the switching element 32 composed of TFTs constituting a liquid crystal cell. The light emitting state of the light-emitting diodes 41R, 41G, and 41B in one image-display frame is measured by the photo-diodes 43R, 43G, and 43B, respectively. The output from the photo-diodes 43R, 43G, and 43B is inputted in the photo-diode control circuit 84 so as to be data (signals) of the luminance and chromaticity of the light-emitting diodes 41R, 41G, and 41B in the photo-diode control circuit 84 and the arithmetic circuit 81. Such data are fed to the LED drive circuit 83 so as to control the emitting state of the light-emitting diodes 41R, 41G, and 41B in the next image-display frame so that a feedback mechanism is formed. On the downstream side of the light-emitting diodes 41R, 41G, and 41B, resistors $r_R$, $r_G$, and $r_B$ for detecting a current are inserted in the light-emitting diodes 41R, 41G, and 41B in series, respectively, so that a current flowing through the resistors $r_R$, $r_G$, and $r_B$ is converted into a voltage. The operation of the light-emitting diode drive power supply 86 is controlled under the control by the LED drive circuit 83 so that the voltage drop due to the resistors $r_R$, $r_G$, and $r_B$ has a predetermined value. In FIG. 4 herein, only one light-emitting diode drive power supply (the constant-current source) 86 is depicted; however, in practice, the required number of the light-emitting diode drive power supplies 86 for driving the light-emitting diodes 41R, 41G, and 41B, respectively, is provided.

The display area composed of pixels formed in a two-dimensional matrix arrangement is divided into (P×Q) display area units, i.e., divided into Q columns and P rows when expressed in "column" and "row". The display area unit 12 is composed of a plurality (M×N) of pixels; when expressed in "column" and "row", it is composed of (N columns×M rows) pixels. The display area unit and the planar light-source unit arranged at the $q_{th}$ column and the $P_{th}$ low (where q=1, 2, ..., Q and p=1, 2, ..., P) are indicated as the display area unit $12_{(q, p)}$ and the planar light-source unit $42_{(q, p)}$, respectively. The suffix $_{(q, p)}$ or $_{-(q, p)}$ may be added to elements or items related to the display area unit $12_{(q, p)}$ or the planar light-source unit $42_{(q, p)}$. The red-luminous sub-pixel (sub-pixel [R]), the green-luminous sub-pixel (sub-pixel [G]), and the blue-luminous sub-pixel (sub-pixel [B]) may be called as the sub-pixel [R, G, B] in block. The red-luminous control signal, the green-luminous control signal, and blue-luminous control signal inputted to the sub-pixel [R, G, B] for controlling the operation of the sub-pixel [R, G, B] (specifically, controlling the light transmittance (open area ratio) may be called as the control signal [R, G, B] in block. Also, the red-luminous sub-pixel drive signal, the green-luminous sub-pixel drive signal, and the blue-luminous sub-pixel drive signal inputted in the drive circuit from the exterior for driving the sub-pixel [R, G, B] constituting the display area unit may be called as the drive signal [R, G, B] in block.

Each pixel is composed of sets of sub-pixels, each set being three sub-pixels of the sub-pixel [R], the sub-pixel [G], and the sub-pixel [B]. In the description of the embodiments below, the luminance control (gradation control) of the sub-pixel [R, G, B] is executed in $2^8$ steps of 0 to 255 as 8-bit control. Hence, each of the values $X_R$, $X_G$, and $X_B$ of the drive signal [R, G, B], inputted into the liquid-crystal display drive circuit 90 for driving each of the sub-pixel [R, G, B] in each pixel constituting the display area unit 12, takes $2^8$-step values. Each of the values $S_R$, $S_G$, and $S_B$ of the pulse-width modulation output signal for controlling the luminous time of the light-emitting diodes 41R, 41G, and 41B constituting the planar light-source unit also takes $2^8$-step values of 0 to 255. However, the embodiment is not limited to this, so that the value may also take $2^{10}$-step values of 0 to 1023 as 10-bit control. In this case, the value of 8-bit may be quadrupled.

A control signal is fed to each pixel from the drive circuit for controlling the light transmittance Lt of the pixel. Specifically, the control signals [R, G, B] are fed to the sub-pixels [R, G, B] from the liquid-crystal display drive circuit 90 for controlling the light transmittance Lt of the sub-pixels [R, G, B], respectively. That is, in the liquid-crystal display drive circuit 90, the control signals [R, G, B] are produced from the inputted drive signals [R, G, B] so that the control signals [R, G, B] are fed (outputted) to the sub-pixels [R, G, B], respectively. Since the light-source luminance $Y_2$ of the planar light-source unit 42 is varied every one image display frame, the control signals [R, G, B] basically have values corrected (compensated) from the drive signals [R, G, B], raised to the power of 2.2, based on the change in light-source luminance $Y_2$. Then, from the timing controller 91 constituting the liquid-crystal display drive circuit 90, the control signals [R, G, B] are fed to the gate driver and the source driver of the transmissive color liquid crystal display 10 by a known method so as to drive the switching element 32 constituting each sub-pixel on the basis of the control signals [R, G, B]. Thus, the light transmittance (open area ratio) Lt of each sub-pixel is controlled by applying a desired voltage across the transparent first electrode 24 and the transparent second electrode 34 constituting the liquid crystal cell. With increasing values of the control signals [R, G, B], the light transmittance (open area ratio) Lt of the sub-pixels [R, G, B] is increased so as to increase the luminance (display luminance y) of the sub-pixels [R, G, B]. Namely, images (normally one kind and spotted) composed of light passing through the sub-pixels [R, G, B] are bright.

The display luminance y and the light-source luminance $Y_2$ are controlled every image display frame, every display area unit, and every planar light-source unit in the image display of the color liquid crystal display 10. The operation of the color liquid crystal display 10 in one image display frame is synchronized with that of the planar light-source apparatus 40. The number of pieces of picture information (pictures/second) fed to the drive circuit per one second as an electric signal is the frame frequency (frame rate) and the reciprocal of the frame frequency is the frame time (unit: second).

First Embodiment

Figure 1A:
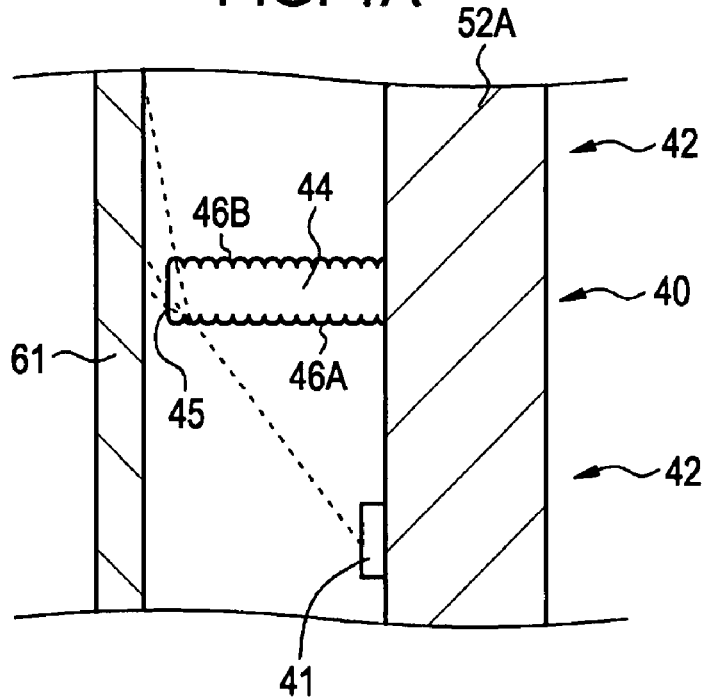
FIGS. 1A and 1B are conceptual diagrams of part of a planar light-source apparatus including a supporting wall according to first and second embodiments, respectively.
Figure 1B:
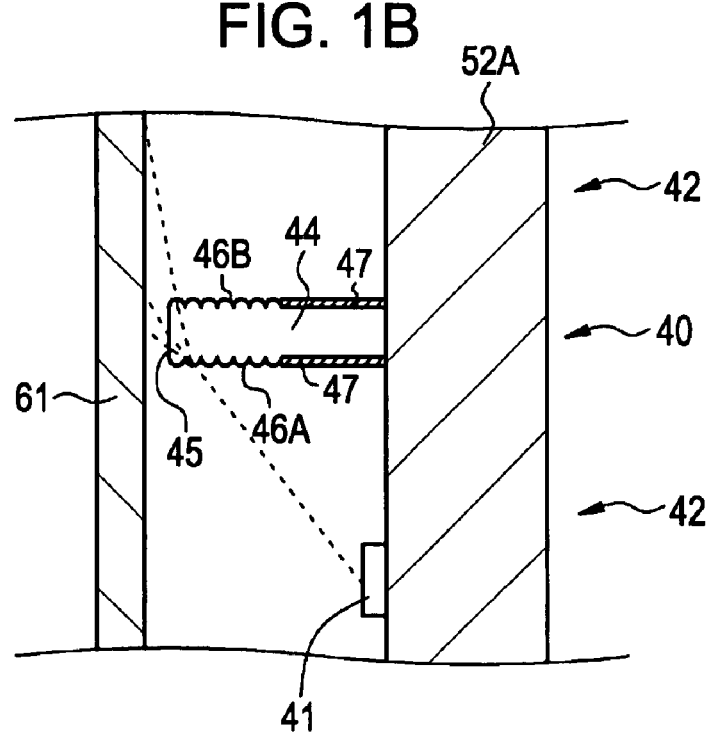

A first embodiment of the present invention relates to a planar light-source apparatus. FIG. 1A is a conceptual diagram of part of the planar light-source apparatus according to the first embodiment. The planar light-source apparatus 40 according to the first embodiment illuminates the transmissive color liquid crystal display 10 from the backside, which includes the display area 11 composed of pixels formed in a two-dimensional matrix arrangement. The planar light-source apparatus 40 according to the first embodiment includes the diffusing plate 61 opposing the color liquid crystal display 10 and a plurality of the planar light-source units 42. Each planar light-source unit 42 includes the light-emitting sources 41 (41R, 41G, 41B), and between the planar light-source units 42, the support wall 44 is arranged for supporting the diffusing plate 61, and the top face 45 of the support wall 44 is arranged close to the diffusing plate 61.

Specifically, as shown in FIG. 1A, since the color liquid crystal display 10 is positioned substantially vertically when it is used, the top face 45 of the support wall 44 is not in contact with the diffusing plate 61 in this state, and the clearance between the top face 45 and the diffusing plate 61 is 1.0 mm or less. On the other hand, when the planar light-source apparatus 40 is horizontally held during manufacturing the planar light-source apparatus or during assembling the planar light-source apparatus with the liquid crystal display, the diffusing plate 61 may come in contact with the top face 45 flatly because of the deflection of the diffusing plate 61. In FIGS. 1A to 2B, the light-emitting source 41, the bottom surface 52A of the casing 51, and the diffusing plate 61 are shaded for the sake of clarity.

According to the first embodiment, when the display area 11 of the color liquid crystal display 10 is assumed to be divided into (P×Q) virtual display area units 12, a plurality of the planar light-source units 42 are composed of the (P×Q) planar light-source units 42 corresponding to the (P×Q) display area units 12, and the light-emitting sources 41 (41R, 41G, 41B) provided in the planar light-source unit 42 are individually controlled. Since the light-source luminance of the planar light-source unit 42 is affected by the luminous state of the light-emitting sources 41 (41R, 41G, 41B) provided in the other planar light-source unit 42, it is desirable to control the luminous state of the light-emitting sources 41 in consideration of this effect.

The light emitted from the light-emitting source 41 provided in the planar light-source unit 42 is diffused by a first side 46A of the support wall 44, which faces the light-emitting source 41, so as to enter the interior of the support wall 44 (shown by dotted line). Then, the light is emitted from a second side 46B, which faces the first side 46A, of the support wall 44 and the top face 45 of the support wall 44. Thereby, the shadow of the support wall 44 is difficult to be formed so as to avoid the possibility of the luminance non-uniformity of the diffusing plate 61.

According to the first embodiment, the support wall 44 is made of a material transparent to the light emitted from the light-emitting source 41 provided in the planar light-source unit 42, specifically it is made of an acrylic resin. On at least upper parts (more specifically whole faces) of the first side 46A and the second side 46B of the support wall 44, unevenness is formed by sand blasting.

According to the first embodiment, or according to second to fourth embodiments, which will be described later, a control signal is fed from the drive circuit to each pixel for controlling the light transmittance Lt of the pixel. More specifically, the control signals [R, G, B] are fed from the drive circuit 90 to the sub-pixels [R, G, B] constituting each pixel for controlling the light transmittance Lt of the sub-pixels [R, G, B], respectively. In each of the planar light-source units $42_{(q,p)}$, the drive signals $[R, G, B]_{(q,p)}$ are inputted to the drive circuits 70, $80_{(q,p)}$, and 90 for driving all the pixels (the sub-pixels $[R, G, B]_{(q,p)}$) constituting the display area unit $12_{(q,p)}$.

In order to obtain the luminance (the second reference value $y_{2-(q,p)}$ of the display luminance in the first reference value $Lt_1$ of the light transmittance) of the pixel (the sub-pixels $[R, G, B]_{(q,p)}$) when the control signal corresponding to the drive signal value equal to the drive signal maximum value $X_{U-max(q,p)}$ in the display area unit, which is the maximum value in the values $X_{R-(q,p)}, X_{G-(q,p)}, X_{B-(q,p)}$ of the inputted drive signals $[R, G, B]_{(q,p)}$, is assumed to be supplied to the pixel, the luminance of the light-emitting source $41_{(q,p)}$ constituting the planar light-source unit $42_{(q,p)}$ corresponding to this display area unit $12_{(q,p)}$ is controlled by the planar light-source unit drive circuit $80_{(q,p)}$.

A driving method of a liquid crystal display assembly according to the first embodiment, or according to the second to fourth embodiments will be described below with reference to FIGS. 3 and 4.

Step-100

The drive signals [R, G, B] for one image display frame fed from a known display circuit, such as a scan converter, and a clock signal CLK are inputted in the backlight control unit 70 and the liquid-crystal display drive circuit 90 (see FIG. 3). The drive signals [R, G, B] are output signals from an image-pickup tube and also are drive signals outputted from a broadcasting station, for example, for controlling the light transmittance Lt of the pixel by being inputted in the liquid-crystal display drive circuit 90. When the quantity of light inputted in the image-pickup tube is assumed as y', the drive signals [R, G, B] can be expressed by the function of y' raised to the power of 0.45. The values $X_R, X_G, X_B$ of the drive signals [R, G, B] for one image display frame inputted in the backlight control unit 70 are once stored in the memory 72 constituting the backlight control unit 70. The values $X_R, X_G, X_B$ of the drive signals [R, G, B] for one image display frame inputted in the liquid-crystal display drive circuit 90 are also once stored in a memory (not shown) constituting the liquid-crystal display drive circuit 90.

Step-110

Then, in the arithmetic circuit 71 constituting the backlight control unit 70, the values of the drive signals [R, G, B] stored in the backlight control unit 70 are read out. At the $(p, q)_{th}$ display area unit $12_{(q,p)}$ (p=1, q=1 at first), the values of the drive signals $[R, G, B]_{(q,p)}$ for driving the sub-pixels [R, G, B]$_{(q,p)}$ in all the pixels are defined as $X_{R-(q,p)}, X_{G-(q,p)}, X_{B-(q,p)}$. The maximum value $X_{U-max(q,p)}$ in the values $X_{R-(q,p)}, X_{G-(q,p)}, X_{B-(q,p)}$ of the drive signals $[R, G, B]_{(q,p)}$ in the display area unit is obtained in the arithmetic circuit 71. The drive signal maximum value $X_{U-max(q,p)}$ in the display area unit is stored in the memory 72. This step is executed to all the pixels m=1, 2, ..., M and n=1, 2, ..., N, that is (M×N) pixels.

For example, when the value $X_{R-(q,p)}$ corresponds to [110], the value $X_{G-(q,p)}$ corresponds to [150], and the value $X_{B-(q,p)}$ corresponds to [50], the value $X_{U-max(q,p)}$ corresponds to [150].

By repeating this operation from (p, q)=(1, 1) to (p, q)=(P, Q), the drive signal maximum value $X_{U-max(q, p)}$ in the display area unit in all the display area units $12_{(q, p)}$ is stored in the memory 72.

In order to obtain the luminance (the display luminance second reference value $Y_{2-(q, p)}$ in the light transmittance first reference value $Lt_1$) when the control signals $[R, G, B]_{(q, p)}$ corresponding to the drive signals $[R, G, B]_{(q, p)}$ having the same values as the drive signal maximum value $X_{U-max(q, p)}$ in the display area unit are assumed to be fed to the sub-pixels $[R, G, B]_{(q, p)}$, by the planar light-source units $42_{(q, p)}$, the light source luminance $Y_{2-(q, p)}$ of the planar light-source unit $42_{(q, p)}$ corresponding to the display area unit $12_{(q, p)}$ is changed under the control of the planar light-source unit drive circuit $80_{(q, p)}$.

Figure 7A:
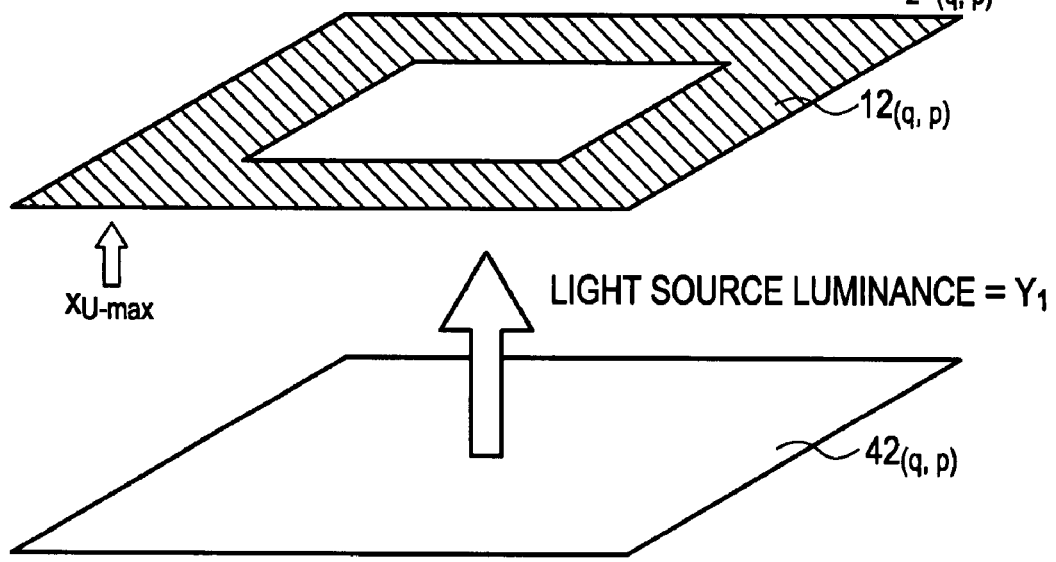
FIGS. 7A and 7B are conceptual diagrams for illustrating a state in that the light-source luminance $Y_2$ of a planar light-source unit is changed under the control by a planar light-source unit drive circuit, such that a second prescribed value $y_2$ of the display luminance, when a control signal equivalent to the drive signal maximum value $x_{U-max}$ within a display area unit is assumed to fed to a pixel, is obtained by the planar light-source unit.
Figure 7B:
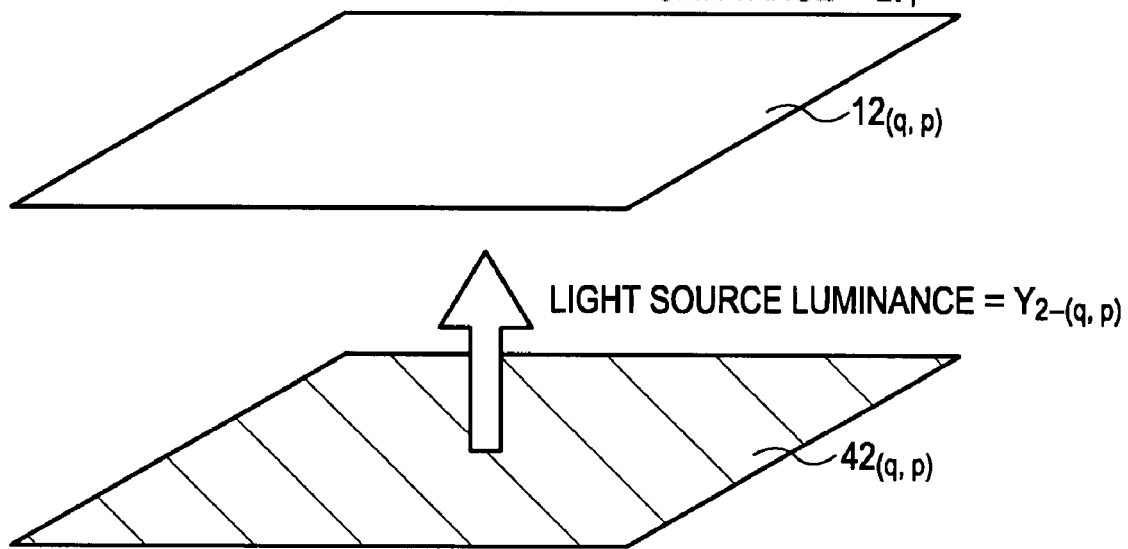

Specifically, for satisfying the following equation (1), the light-source luminance $Y_2$ has only to control the light-source luminance $Y_2$ every one image display frame and every one planar light-source unit. More specifically, on the basis of the equation (2) that is the light-source luminance control function $g(X_{nol-max})$, the luminance of the light-emitting source $41_{(q, p)}$ is controlled and the light-source luminance $Y_2$ has only to be controlled so as to satisfy the equation (1). Such control conceptual diagram is shown in FIGS. 7A and 7B. However, as will be described later, the correction based on the effect of the other planar light-source unit 42 is required to perform on the light-source luminance $Y_2$. A relationship regarding to the control of the light-source luminance $Y_2$ may be obtained in advance to store it in the memory 72. The relationship is between the drive signal maximum value $X_{U-max(q, p)}$ in the display area unit, the control signal value corresponding to the drive signal having the same value as the drive signal maximum value $X_{U-max(q, p)}$, the second reference value $y_{2-(q, p)}$ of the display luminance when such a control signal is fed to the pixel (sub-pixel), the light transmittance (open area ratio [the light transmittance second reference value $Lt_2$]) of each sub-pixel at this time, and the luminance control parameter in the planar light-source unit obtainable the display luminance second reference value $y_2$ when the light transmittance (open area ratio) of each sub-pixel is the light transmittance first reference value $Lt1_{,\alpha}$ $$Y_2 \cdot Lt_1 = Y_1 \cdot Lt_2 \qquad (1)$$

$$g(X_{nol-max}) = a_1 \cdot (X_{nol-max})^{2.2} + a_0 \qquad (2)$$

$$X_{nol-max} \equiv X_{U-max}/X_{max},$$

where $X_{max}$ is the maximum value of the drive signals [R, G, B] inputted in the liquid-crystal display drive circuit 90 for driving the pixel (or each of the sub-pixels [R, G, B]); and $a_1$ and $a_0$ are constants expressed by:

$$a_1 + a_0 = 1$$

$0 < a_0 < 1$, $0 < a_1 < 1$, and for example, they may be:

$$a_1 = 0.99$$

$$a_0 = 0.01.$$

Since each value of $X_R$, $X_G$, $X_B$ of the drive signals [R, G, B] takes 28 steps, the value of $X_{max}$ corresponds to [255].

In the planar light-source apparatus, when the luminance control for the planar light-source units $42_{(1,1)}$ in (p, q)=(1,1) is assumed, it is necessary for considering the effect from the (P×Q) other planar light-source units 42. Since such an effect is known in advance by the luminous profile of the planar light-source unit 42, the difference can be calculated by inverse operation, enabling the correction. The fundamental arithmetic form will be described below.

The luminance (the light-source luminance $Y_2$) demanded for the (P×Q) planar light-source units 42 based on the equations (1) and (2) is expressed by the matrix $[L_{P \times Q}]$. The luminance of some planar light-source unit obtained when only the some planar light-source unit is driven while other planar light-source units are not driven is sought from the (P×Q) planar light-source units 42 in advance. Such a luminance is expressed by the matrix $[L'_{P \times Q}]$. Furthermore, a correction factor is expressed by the matrix $[\alpha_{P \times Q}]$. Then, the relationship between these matrices can be expressed by the following equation (3-1). The matrix $[\alpha_{P \times Q}]$ of the correction factor can be obtained in advance.

$$[L_{P \times Q}] = [L'_{P \times Q}] \cdot [\alpha_{P \times Q}] \qquad (3-1)$$

Thereby, the matrix $[L_{P \times Q}]$ may be asked from the equation (3-1), that is, from the calculation of the inverse matrix:

$$[L'_{P \times Q}] = [L_{P \times Q}][\alpha_{P \times Q}]^{-1} \qquad (3-2).$$

Then, for obtaining the luminance expressed by the matrix $[L'_{P \times Q}]$, the light-emitting source $41_{(q, p)}$ may be controlled. Specifically, such operation may be executed using the information (data table) stored in the memory 82. When the light-emitting source $41_{(q, p)}$ is controlled, the matrix $[L'_{P \times Q}]$ cannot take a negative value, so that the calculated results must be obviously limited to the positive region. Hence, the solution is not an exact solution but it may be approximate one.

In such a manner, on the basis of the matrix $[L_{P \times Q}]$ and the matrix $[\alpha_{P \times Q}]$ of the correction factor obtained based on the equations (1) and (2), which are obtained in the arithmetic circuit 71 constituting the backlight control unit 70, the matrix $[L'_{P \times Q}]$ is sought of the luminance when the planar light-source unit is assumed to be independently driven as mentioned above. Furthermore, on the basis of the conversion table stored in the memory 72, the matrix $[L'_{P \times Q}]$ is converted into integers corresponding to a range of 0 to 255. In such a manner, in the arithmetic circuit 71 constituting the backlight control unit 70, the value $S_{R-(q, p)}$ of the pulse-width modulation output signal for controlling the luminous time of the red light-emitting diodes $41R_{(q, p)}$, the value $S_{G-(q, p)}$ of the pulse-width modulation output signal for controlling the luminous time of the green light-emitting diodes $41G_{(q, p)}$, and the value $S_{B-(q, p)}$ of the pulse-width modulation output signal for controlling the luminous time of the blue light-emitting diodes $41B_{(q, p)}$ in the planar light-source unit $42_{(q, p)}$ are obtained.

Step-120

Then, the values $S_{R-(q, p)}$, $S_{G-(q, p)}$ and $S_{B-(q, p)}$ of the pulse-width modulation output signals obtained in the arithmetic circuit 71 constituting the backlight control unit 70 are fed to and stored in the memory 82 of the planar light-source unit drive circuit $80_{(q, p)}$ provided corresponding to the planar light-source unit $42_{(q, p)}$. The clock signal CLK is also fed to the planar light-source unit drive circuit $80_{(q, p)}$ (see FIG. 4).

Step-130

Then, on the basis of the values $S_{R-(q, p)}$, $S_{G-(q, p)}$, and $S_{B-(q, p)}$ of the pulse-width modulation output signals, the ON time $t_{R-ON}$ and the off time $t_{R-OFF}$ of the red light-emitting diode 41R, the ON time $t_{G-ON}$ and the off time $t_{G-OFF}$ of the green light-emitting diode 41G, and the ON time $t_{B-ON}$ and the off time $t_{B-OFF}$ of the blue light-emitting diode 41B constituting the planar light-source units $42_{(q, p)}$ are determined in the arithmetic circuit 81. Where:

$$t_{R-ON} + t_{R-OFF} = t_{G-ON} + t_{G-OFF} = t_{B-ON} + t_{B-OFF} = \text{Constant}$$
$$t_{Const.}$$

The duty ratio in the driving based on the pulse-width modulation of the light-emitting diode is expressed by:

$$t_{ON}/(t_{ON}+t_{OFF}) = t_{ON}/t_{Const}.$$

The signal corresponding to the ON time $t_{R-ON}$ of the red light-emitting diode $41R_{(q, p)}$, the signal corresponding to the ON time $t_{G-ON}$ of the green light-emitting diode $41G_{(q, p)}$, and the signal corresponding to the ON time $t_{B-ON}$ of the blue light-emitting diode $41B_{(q, p)}$ constituting the planar light-source units $42_{(q, p)}$ are fed to the LED drive circuit 83. By the LED drive circuit 83, on the basis of the signal values corresponding to the on-times $t_{R-ON-(q, p)}$, $t_{G-ON-(q, p)}$, and $t_{B-ON-(q, p)}$, the switching elements $85R_{(q, p)}$, $85G_{(q, p)}$, and $85B_{(q, p)}$ become on state for the on times $t_{R-ON-(q, p)}$, $t_{G-ON-(q, p)}$, and $t_{B-ON-(q, p)}$, respectively, so that an LED drive current is passed through the light-emitting diodes $41R_{(q,p)}$, $41G_{(q, p)}$, and $41B_{(q, p)}$ from the light-emitting diode drive power supply 86. As a result, the light-emitting diodes $41R_{(q, p)}$, $41G_{(q, p)}$, and $41B_{(q, p)}$ emit light in one image display frame for the on times $t_{R-ON-(q, p)}$, $t_{G-ON-(q, p)}$, and $t_{B-ON-(q, p)}$, respectively. In such a manner, the $(p, q)_{th}$ display area unit $12_{(q, p)}$ is illuminated at a predetermined illumination intensity.

Figure 8A:
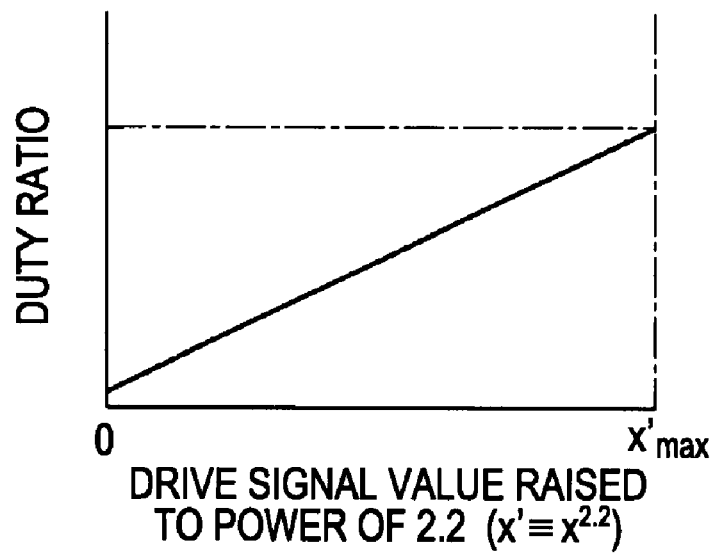
FIG. 8A is a graph schematically showing the relationship between the drive signal value, raised to the power of 2.2 ($X'=X^{2.2}$), inputted into a liquid crystal display drive circuit for driving a sub-pixel and the duty ratio ($=t_{on}/t_{const}$)
Figure 8B:
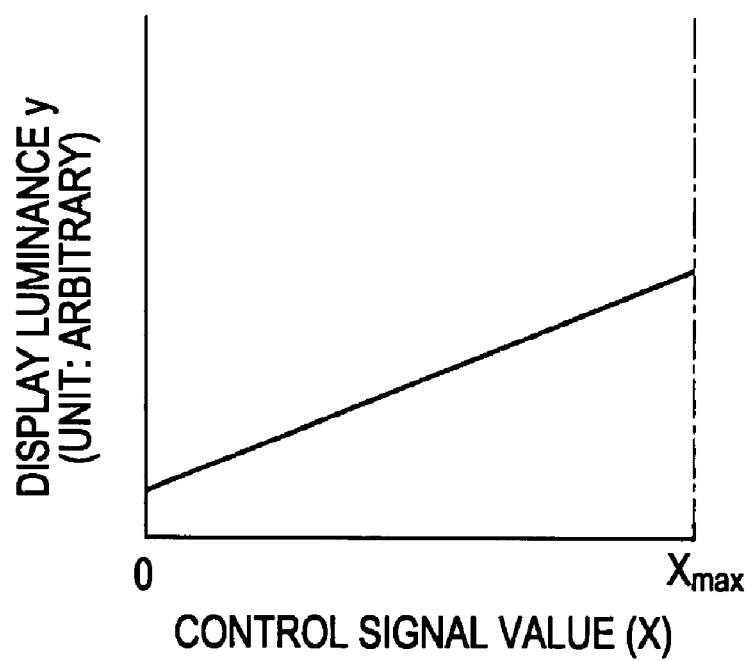
FIG. 8B is a graph schematically showing the relationship between the control signal value X for controlling the light transmittance of the sub-pixel and the display luminance y.

The state obtained in such a manner is shown by the solid lines of FIGS. 8A and 8B, wherein FIG. 8A schematically shows the relationship between the value ($x' \equiv x^{2.2}$) obtained by raising the drive signal value inputted to the liquid-crystal display drive circuit 90 for driving the sub-pixel to the power of 2.2 and the duty ratio $t_{ON}/t_{Const}$; and FIG. 8B schematically shows the relationship between the value X of the control signal for controlling the light transmittance Lt of the sub-pixel and the display luminance y.

On the other hand, the values $X_{R-(q, p)}$, $X_{G-(q, p)}$, $X_{B-(q, p)}$ of the drive signals [R, G, B]$_{(q, p)}$ inputted in the liquid-crystal display drive circuit 90 are fed to the timing controller 91 so that the control signal [R, G, B]$_{(q,p)}$ equivalent to the inputted drive signals [R, G, B]$_{(q, p)}$ are supplied to the sub-pixels [R, G, B]$_{(q, p)}$ in the timing controller 91. The relationship between the values $X_{R-(q, p)}$, $X_{G-(q, p)}$, $X_{B-(q, p)}$ of the control signals [R, G, B]$_{(q, p)}$ produced the timing controller 91 of the liquid-crystal display drive circuit 90 for supplying from the liquid-crystal display drive circuit 90 to the sub-pixels [R, G, B]$_{(q, p)}$ and the values $X_{R-(q, p)}$, $X_{G-(q, p)}$, $X_{B-(q, p)}$ of the drive signals [R, G, B]$_{(q, p)}$ satisfies the following equations (4-1), (4-2), and (4-3). Since the light-source luminance $Y_{2-(q, p)}$ of the planar light-source unit $42_{(q, p)}$ is varied every image display frame, the control signals [R, G, B]$_{(q, p)}$ fundamentally include the value obtained by correcting (compensating) the drive signal values [R, G, B]$_{(q, p)}$ raised to the power of 2.2 based on the change in light-source luminance $Y_{2-(q, p)}$. That is, according to the embodiment, since light-source luminance $Y_{2-(q, p)}$ is varied every one image display frame, for obtaining the second reference value $Y_{2-(q, p)}$ of the display luminance in the light-source luminance $Y_{2-(q, p)}$ ($\leq Y_1$), the values $X_{R-(q,p)}$, $X_{G-(q,p)}$, $X_{B-(q,p)}$ of the control signals [R, G, B]$_{(q,p)}$ are determined, so that the light transmittance Lt of the pixel or the sub-pixel is controlled by correcting (compensating) the values. The functions $f_R$, $f_G$, $f_B$ of the equations (4-1), (4-2), and (4-3) are obtained in advance for the correction (compensation).

$$X_{R-(q,p)} = f_R(b_{1\_R} \cdot X_{R-(q,p)}^{2.2} + b_{0\_R}) \quad (4\text{-}1)$$

$$X_{G-(q,p)} = f_G(b_{1\_G} \cdot X_{G-(q,p)}^{2.2} + b_{0\_G}) \quad (4\text{-}2)$$

$$X_{B-(q,p)} = f_B(b_{1\_B} \cdot X_{B-(q,p)}^{2.2} + b_{0\_B}) \quad (4\text{-}3)$$

where $b_{1\_R}$, $b_{0\_R}$, $b_{1\_G}$, $b_{0\_G}$, $b_{1\_B}$, and $b_{0\_B}$ are constants.

In such a manner, the image display operation in one image display frame is completed.

Second Embodiment

A second embodiment is a modification of the first embodiment. According to the second embodiment, as shown in the conceptual partial diagram of FIG. 1B, the unevenness is formed on upper parts of the first side 46A and the second side 46B of the support wall 44 while a light reflection layer 47 is formed on the residual parts of the first side 46A and the second side 46B of the support wall 44. More specifically, the silver-added reflection film formed by sequentially laminating a silver reflection film, a low refractive-index film, and a high refractive-index film may be bonded with an adhesive on the residual parts of the first side 46A and the second side 46B of the support wall 44.

Third Embodiment

A third embodiment is also a modification of the first embodiment. According to the third embodiment, in the same way as in the first embodiment, the support wall 44 is made of a material transparent to the light emitted from the light-emitting source 41 provided in the planar light-source unit 42. However, differently from the first embodiment, as shown in the conceptual partial diagram of FIG. 2A, on at least upper parts (more specifically whole faces) of the first side 46A and the second side 46B of the support wall 44, a light-transmissive diffusing film 48 is bonded with an adhesive.

Fourth Embodiment

A fourth embodiment is a modification of the third embodiment. According to the fourth embodiment, as shown in the conceptual partial diagram of FIG. 2B, the light-transmissive diffusing film 48 is bonded on upper parts of the first side 46A and the second side 46B of the support wall 44 while a light reflection layer 49 is bonded on the residual parts of the first side 46A and the second side 46B of the support wall 44. More specifically, the silver-added reflection film may be bonded with an adhesive on the residual parts of the first side 46A and the second side 46B of the support wall 44.

The preferred embodiments of the present invention have been described as above; however, the invention is not limited to these embodiments. The configurations, structures, members, and materials of the transmissive color crystal display, the planar light-source apparatus, the planar light-source unit, the assembly of liquid crystal display, and the drive circuit described in the embodiments are examples, so that they may be appropriately modified. The luminance of the planar light-source unit 42 may also be compensated (corrected) and the temperature may also be controlled by monitoring the light-emitting diode temperature with a temperature sensor so as to feed back its result to the planar light-source unit drive circuit 80. According to the embodiments, the display area of the liquid crystal display is assumed to be divided into (P×Q) virtual display area units; alternatively, the display area of the transmissive liquid crystal display may be divided into (P×Q) actual display area units in some cases. Furthermore, the top face of the support wall may be flat or it may also be convex toward the diffusing plate (when the height direction of the support wall is along the Z-axis and the thickness direction thereof is along the X-axis, the cross-sectional shape across the XZ-plane may be elliptical, circular, half oblong, parabolic, part of the curve expressed by the tertiary or more polynomial expression, or bell-shaped).

It should be understood by those skilled in the art that various modifications, combinations, sub-combinations and alterations may occur depending on design requirements and other factors insofar as they are within the scope of the appended claims or the equivalents thereof.

What is claimed is:

1. A planar light-source apparatus for illuminating, from a backside, a transmissive liquid crystal display having a display area composed of pixels formed in a two-dimensional matrix arrangement, the planar light-source apparatus comprising:
   a diffusing plate facing the liquid crystal display;
   a plurality of planar light-source units, each of the planar light-source units having a light source; and
   a support wall arranged between the plurality of planar light-source units and configured to support the diffusing plate,
   wherein a top face of the support wall lies adjacent to the diffusing plate, and
   wherein the support wall is made of a material transparent to light emitted from the light sources.

2. The apparatus according to claim 1, wherein the display area of the liquid crystal display is divided into (P×Q) virtual display area units, wherein the plurality of planar light-source units includes (P×Q) planar light-source units corresponding to the (P×Q) display area units, and wherein the light sources of the light-source units are individually controlled.

3. The apparatus according to claim 1, wherein the support wall comprises a first side facing the light source of a light-source unit of the plurality of light-source units and further comprises a second side opposing the first side, and wherein the light source and the support wall are configured such that at least some light emitted from the light source is diffused on the first side of the support wall facing the light source and is subsequently emitted from the second side opposing the first side and from the top face of the support wall.

4. The apparatus according to claim 3, wherein at least a portion of each of the first side and the second side of the support wall has an uneven surface.

5. The apparatus according to claim 4, wherein the at least a portion of each of the first side and the second side is positioned proximate the diffusing plate, and wherein remaining portions of each of the first side and second side distal the diffusing plate have a light reflection layer formed thereon.

6. The apparatus according to claim 3, further comprising a light-transmissive diffusing film bonded on at least upper parts of the first side and the second side of the support wall.

7. The apparatus according to claim 6, further comprising a light reflection layer formed on residual parts of the first side and the second side of the support wall on which the light-transmissive diffusing film is not formed.

8. The planar light-source apparatus of claim 1, wherein the planar light-source apparatus forms at least part of a display.

9. The apparatus of claim 1, wherein the material transparent to light emitted from the light sources comprises polymethylmethacrylate.

10. The apparatus of claim 1, wherein the material transparent to light emitted from the light sources comprises polycarbonate resin.

11. The apparatus of claim 1, wherein the material transparent to light emitted from the light sources comprises polyarylate resin.

12. The apparatus of claim 1, wherein the material transparent to light emitted from the light sources comprises polyethylene terephthalate resin.

13. The apparatus of claim 1, wherein the material transparent to light emitted from the light sources comprises glass.

14. The apparatus of claim 1, wherein the diffusing plate is flexible, and wherein the support wall is configured to only contact the diffusing plate upon deflection of the diffusing plate.

15. A display comprising a planar light-source apparatus for illuminating, from a backside, a transmissive liquid crystal display having a display area composed of pixels formed in a two-dimensional matrix arrangement, wherein the planar light-source apparatus includes:
   a diffusing plate facing the liquid crystal display;
   a plurality of planar light-source units, each of the planar light-source units having a light source; and
   a support wall arranged between the planar light-source units and configured to support the diffusing plate,
   wherein a top face of the support wall lies adjacent to the diffusing plate, and
   wherein the support wall is made of a material transparent to light emitted from the light sources.

* * * * *